United States Patent [19]
Wilkinson

[11] 4,160,428
[45] Jul. 10, 1979

[54] RACING MUZZLE FOR DOGS

[76] Inventor: Victor E. Wilkinson, 301 W. Cambridge, Phoenix, Ariz. 85003

[21] Appl. No.: 946,580

[22] Filed: Sep. 28, 1978

Related U.S. Application Data

[63] Continuation-in-part of Ser. No. 873,788, Jan. 31, 1978.

[51] Int. Cl.² ............................................. A01K 25/00
[52] U.S. Cl. ................................................. 119/133
[58] Field of Search ............... 119/129, 130, 131, 133; 54/80

[56] References Cited
U.S. PATENT DOCUMENTS

| | | | |
|---|---|---|---|
| 1,179,149 | 4/1916 | Weikert | 119/133 |
| 3,173,401 | 3/1965 | Lupo, Sr. | 119/133 |

*Primary Examiner*—Hugh R. Chamblee
*Attorney, Agent, or Firm*—Cahill, Sutton & Thomas

[57] ABSTRACT

Air inlets are disposed in the anterior surface of a racing muzzle for a dog to receive and channel air directly into the open mouth of the dog while the dog is running and breathing only through its mouth; further inlets in proximity to the dog's nostrils accommodate airflow during quiescent periods when the dog is breathing through its nostrils. Aerodynamically located openings promote exhaust airflow from the sides of the dog's mouth and minimize the presence of stale air within the muzzle.

8 Claims, 5 Drawing Figures

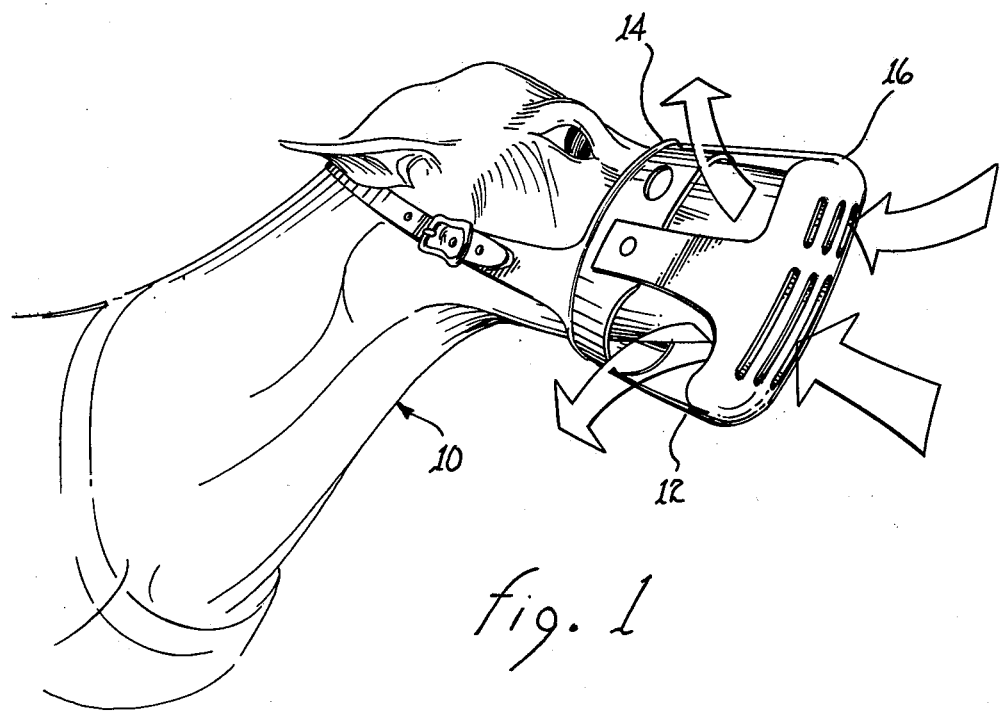
fig. 1
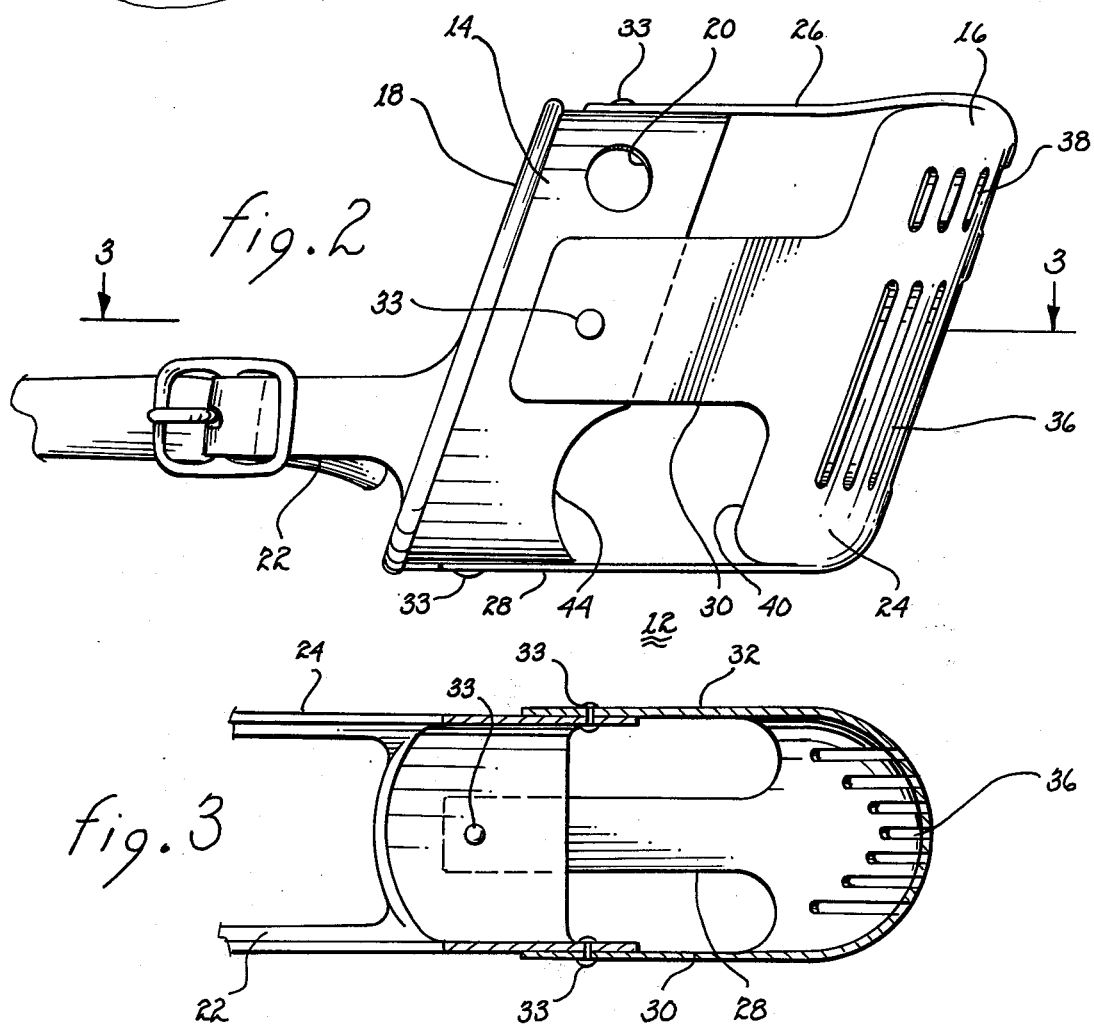
fig. 2
fig. 3

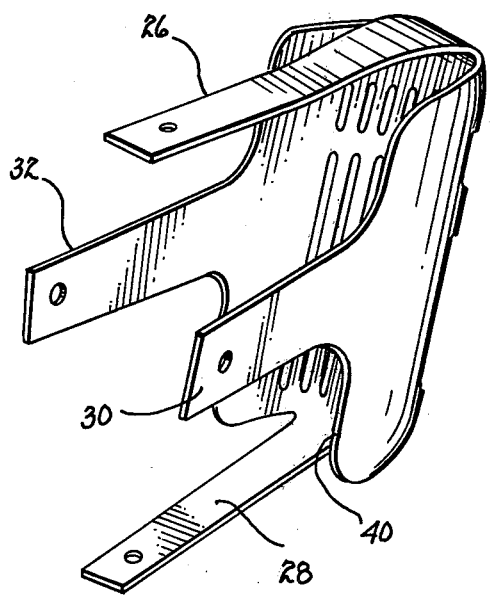
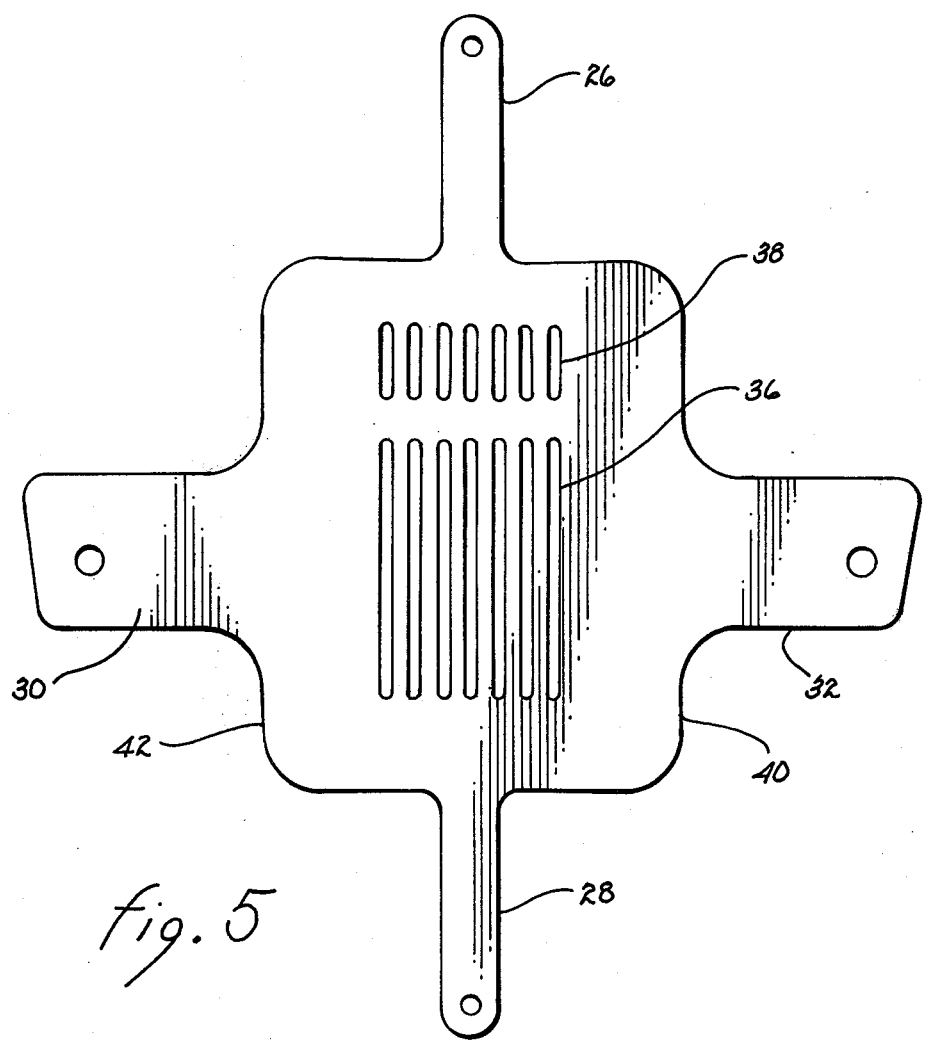

RACING MUZZLE FOR DOGS

The present application is a continuation-in-part application of copending U.S. Pat. application entitled "Racing Dog Muzzle", Ser. No. 873,788, filed on Jan. 31, 1978, and describing an invention invented by the present inventor.

The present application is directed to dog muzzles and, more particularly, to muzzles for racing dogs.

During dog racing events, the dogs must wear muzzles to prevent injuries from fights and any biting which may occur. Additionally, the muzzles serve a protective function to reduce the probability of injury to the dog's head should the dog run into a fixed object or be knocked down as a result of a collision with another dog.

A dog muzzle of the type sometimes used at dog racing events is illustrated and described in U.S. Pat. No. 3,173,401 issued to A. J. Lupo, Sr. This muzzle includes an L-shaped rigid elongated strip of plastic material which serves as a nose guard. The nose guard is attached to a similarly rigid mouth guard. The mouth guard has side portions extending forwardly from a circumscribing guard member and a lower leg portion extending beneath the dogs lower jaw to the guard member. Apertures are disposed in the side portions of the mouth guard; and, further apertures are disposed in the guard member itself. A conventional strap maintains the muzzle afixed to the dog.

A muzzle of this type does indeed prevent the dogs from biting one another but it suffers from several severe detriments. Because the muzzle is of rigid material, it is incapable of absorbing any shocks due to collision and any shock that is directly imparted to the dog's head. Should the shock be severe, the muzzle may crack or permanently deform resulting in substantial and often fatal injury to the dog. The speed at which any dog can run is directly reflective of the quantity of oxygen ingested by the dog during such physical exertion. Since any muzzle will, to a greater or lesser extent, restrict air flow into the dog's mouth, the intake of oxygen will be impaired. The Lupo muzzle does include laterally disposed apertures for the purpose of introducing fresh air interior to the muzzle but the orientation of these apertures precludes the existence of rammed air into the mouth of the dog. Consequently, the major air flow in the dog's mouth occurs only through the side of the dog's mouth. The inflowing air directly opposes air exhaustion from the dog's mouth during exhalation.

Other muzzles of various types have been developed, which muzzles are primarily used for training purposes, such as the wire muzzle described in U.S. Pat. No. 1,179,149 issued to A. W. Weikert. Muzzles of this type are used for either training purposes or for preventing a dog from biting persons or other dogs. Such muzzles either may not be used in dog racing events because of pertinent regulations or are totaly unsuitable when vast quantities of air must be rapidly inhaled by a dog.

It is therefore a primary object of the present invention to provide a racing muzzle for dogs which promotes air inflow to the dog's mouth.

Another object of the present invention is to provide a racing muzzle for dogs which directs the airflow into and out of a dog's mouth.

Yet another object of the present invention is to provide a dog racing muzzle having a plurality of vertical slots disposed in the anterior surface for accommodating rammed air inflow to the mouth of the dog.

Still another object of the present invention is to provide a racing muzzle for dogs which promotes exhaustion of exhaled air.

A further object of the present invention is to provide an impact absorbing racing muzzle for dogs.

A yet further object of the present invention is to provide a protective racing muzzle for dogs.

These and other objects of the present invention will become apparent to those skilled in the art as the description thereof proceeds.

FIG. 1 is a perspective view illustrating a racing muzzle;

FIG. 2 is a side elevational view of the racing muzzle;

FIG. 3 is a cross-sectional view taken along lines 3—3 as shown in FIG. 2;

FIG. 4 is a rear perspective view of the front guard member of the muzzle; and

FIG. 5 is a plan view of the front guard member.

A dog 10 wearing muzzle 12 and in the act of running is illustrated in FIG. 1. The muzzle includes a rear guard piece 14 which snuggly but comfortably encircles the dog's jaws and extends forwardly from the top. A pair of straps extend rearwardly from opposed sides of the rear guard piece about the rear of the dog's head and beneath the poll to maintain the muzzle in place. The rear edge of the rear guard piece may extend rearwardly and downwardly, as shown. Front guard piece 16 is attached to and extends forwardly of the rear guard piece. The front guard piece has two primary purposes: to enclose the dog's jaw and prevent the dog from biting; and, to encourage a flow of fresh air into the front of the dog's mouth and draw out the exhaled air from the side of the dog's mouth when the dog is running. The front guard piece also serves secondary functions such as protecting the dog's nose, teeth and jaws from serious injury in the event of collision or knock-down during a race.

The constructional features of muzzle 12 will be described with particular reference to FIGS. 2 and 3. Rear guard piece 14 is formed of pliable but resilient material to firmly locate muzzle 12 upon the dog. The rear edge may include combing 18, which combing actually bears against the skin of the dog and which may have the effect of circumscribingly displacing the band-like part of the rear guard piece to allow at least some airflow adjacent the dog's skin for cooling purposes. Apertures, such as aperture 20, may be incorporated to further aid in air circulation in and about the skin underlying the rear guard piece. Bands 22 and 24 extend rearwardly from the rear guard piece for attaching the muzzle as depicted in FIG. 1.

Referring jointly to FIGS. 2, 3, 4, and 5, forward guard piece 16 includes upper and lower straps 26 and 28, respectively, and side straps 30 and 32, respectively. These straps may be attached to rear guard piece 14 by means such as rivets 33. Central member 34 is essentially a rectangular piece of pliable resilient material from which the straps extend and which member is curved about a skewed and generally vertically oriented axis to define a partial cylindrical surface at the forward most point of the muzzle. This cylindrical surface serves various apparent and some not so apparent functions.

As a racing dog breathes only through its mouth while running, any impediment to the flow of inhaled air necessarily reduces the oxygen consumption capability of the dog. To encourage rammed air flow into the dog's mouth, a plurality of vertically oriented slots 36 are disposed in central member 34. These slots are preferrably ⅛ of an inch wide and 2¾ inch long and located within the central member to be in general horizontal alignment with the dog's open mouth. With slots of this dimension, there exists airflow therethrough directly into the dog's open mouth to enhance oxygen intake during forward motion. By maintaining the width of the material intermediate the adjacent slots at approximately ⅛ of an inch and coupled with the general cylindrical curvature of the central member, sufficient strength and resiliency exists to maintain the protective features of the muzzle. Further slots 38, which slots are in general longitudinal alignment with slots 36, are located within the central member in general horizontal alignment with the dog's nostrils. Slots 38 and 36 are vertically displaced from one another by a segment approximately ½ inch wide. The resulting imperforate curved segment between the sets of slots is located so as not to impede airflow into the dog's mouth and yet serve in the manner of a horizontal stiffener to maintain the curvature of the central member and prevent collapse of the central member in the event of impact with a fixed object, other dog or during a knock-down.

Strap 26 extends upwardly and rearwardly from central member 34 in general parallel relationship with the dog's snout. To accommodate the slight bulbousness of the dog's nose, strap 26 may be curved as illustrated in FIG. 2. The combination of strap 26, the curved central section of member 34 extending between strap 26 and strap 28 serve in the manner of a stiffener to prevent collapse of the front guard piece during collision, etc. Thus, this functionally developed vertical stiffener in combination with the functionally developed horizontal stiffener existing intermediate slots 36 and 38 serve in combination as a reinforcing grid to the front guard piece.

During exhalation, the air is generally forced out the sides of a dog's mouth. The less effort the dog need expend to exhale and the less mixing there is between the exhaled air and subsequently inhaled air, the greater is the flow of fresh oxygen to the dog's lungs. The generally cylindrical forward surface of central member 34 tends to force the air which does not flow through slots 36 to flow around the central member and past the rear edges thereof (edge 40, FIG. 2). Such horizontal flow tends to have an increase velocity proximate the rear edges, which increased velocity reduces the ambient pressure proximate the rear edges. This area of reduced pressure, which is located in proximity to the rear sides of the dog's mouth, tends to encourage lateral outward air flow from the dog's mouth during exhalation. Thus, more efficient airflow in and out of the dog's mouth results. To ensure removal of any constriction adjacent the rear of the dog's mouth which might impede airflow during exhalation, the forward edges of rear guard piece 14, such as edge 44, may be cut away as illustrated in FIG. 2.

From the above description, it becomes apparent that slots 36 provide a rammed airflow into the dog's mouth when the dog is running to increase the volume of air inhaled. Additionally, more complete exhalation of air is promoted by the establishment, through forward motion of the dog, of a low pressure environment attendant the rear sides of the dog's mouth. These aerodynamically encouraged air flows tend to increase the oxygen quantity inhaled during each breathing cycle. The greater the quantity of oxygen supplied to the blood, the better will the dog's physical endurance and speed become. And, the greater the dog's speed, the greater is his chance of winning each race entered.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A muzzle for enhancing respiration of racing dogs, said muzzle comprising in combination:
    (a) a rear guard piece for encircling the dog's upper and lower jaws forward of the dog's stop, said rear guard piece having a top, a bottom and opposed sides;
    (b) band means extending from said rear guard piece for securing said muzzle upon the dog;
    (c) a foward guard piece disposed forwardly of said rear guard piece for enclosing the distal end of the dog's upper and lower jaws, said forward guard piece having a vertical axis and a horizontal axis and defining substantially a U-shape in horizontal cross-section and wherein the legs of said U-shape are adjacent the respective sides of the dog's jaws and the base of said U-shape is forwardly proximate the dog's nostrils and distal end of the dog's jaws whereby, during forward movement of the dog, said U-shape defines an aerodynamic body for establishing a higher than ambient pressure environment adjacent said base and a lower than ambient pressure environment adjacent said sides;
    (d) means for attaching said forward guard piece to said rear guard piece;
    (e) said forward guard piece including:
        i. a central member defining said base;
        ii. intake aperture means disposed in said central member for channeling air directly into the dog's mouth in response to presence of the higher than ambient pressure environment, said first aperture means including a series of vertical slots approximately ⅛ inch wide and extending horizontally laterally from the center of said central member, said slots being approximately 2 inches long, whereby the width of said slots restricts the flow of particulate matter into said forward guard piece; and
    (f) exhaust aperture means disposed within the sides of said muzzle for exhausting air out of said muzzle during exhalation by the dog in response to presence of the lower than ambient pressure environment;

whereby, said muzzle is aerodynamically structured to promote inhalation of fresh air and evacuation of exhaled air when the dog is racing.

2. The muzzle as set forth in claim 1 wherein said intake aperture means comprise a further series of vertical slots approximately ⅛ inch wide and extending horizontally laterally from the center of said central member, said further series of slots being vertically upwardly displaced from said series of vertical slots.

3. The muzzle as set forth in claim 2 wherein said further series of vertical slots is vertically displaced from said series of vertical slots by ½ inch.

4. The muzzle as set forth in claim 1 wherein each slot of said series of vertical slots is approximately 2¾ inches long.

5. The muzzle as set forth in claim 1 wherein said exhaust aperture means is disposed intermediate said rear guard piece and said forward guard piece.

6. The muzzle as set forth in claim 5 wherein said exhaust aperture means is defined by spaces bounded by said rear guard piece, said forward guard piece and said attaching means.

7. The muzzle as set forth in claim 6 wherein said exhaust aperture means is enlarged by a cutaway portion along the forward edge of said rear guard piece.

8. The muzzle as set forth in claim 1 wherein said attaching means comprises straps, one of said straps being disposed at the top, bottom and each side of said muzzle.

* * * * *